US012381335B2

(12) United States Patent
Wang

(10) Patent No.: US 12,381,335 B2
(45) Date of Patent: Aug. 5, 2025

(54) ELECTRIC ENERGY TRANSMISSION JOINT AND PREPARATION METHOD THEREFOR

(71) Applicant: JILIN ZHONG YING HIGH TECHNOLOGY CO., LTD., Jilin (CN)

(72) Inventor: Chao Wang, Jilin (CN)

(73) Assignee: JILIN ZHONG YING HIGH TECHNOLOGY CO., LTD., Jilin (CN)

( * ) Notice: Subject to any disclaimer, the term of this patent is extended or adjusted under 35 U.S.C. 154(b) by 318 days.

(21) Appl. No.: 17/916,492

(22) PCT Filed: Apr. 1, 2021

(86) PCT No.: PCT/CN2021/084901
§ 371 (c)(1),
(2) Date: Sep. 30, 2022

(87) PCT Pub. No.: WO2021/197414
PCT Pub. Date: Oct. 7, 2021

(65) Prior Publication Data
US 2023/0231328 A1 Jul. 20, 2023

(30) Foreign Application Priority Data
Apr. 1, 2020 (CN) ......................... 202010249743.8

(51) Int. Cl.
*H01R 4/20* (2006.01)
*H01R 4/62* (2006.01)
(Continued)

(52) U.S. Cl.
CPC ............... *H01R 4/20* (2013.01); *H01R 4/625* (2013.01); *H01R 11/12* (2013.01); *H01R 43/02* (2013.01);
(Continued)

(58) Field of Classification Search
CPC ......... H01R 11/11; H01R 11/12; H01R 11/13; H01R 11/14; H01R 11/16; H01R 43/16
(Continued)

(56) References Cited

U.S. PATENT DOCUMENTS

| | | | | |
|---|---|---|---|---|
| 2,802,257 A * | 8/1957 | Holtzapple | ............ | H01R 4/206 29/862 |
| 6,538,203 B1 * | 3/2003 | Nolle | .................. | H01R 11/283 174/84 C |

(Continued)

FOREIGN PATENT DOCUMENTS

| | | |
|---|---|---|
| CN | 105305124 | 2/2016 |
| CN | 107302143 | 10/2017 |

(Continued)

OTHER PUBLICATIONS

International Searching Authority, "International Search Report and Written Opinion," issued in connection with PCT Application No. PCT/CN2021/084901, with English Translation, dated Jul. 1, 2021, 10 pages.

(Continued)

*Primary Examiner* — Abdullah A Riyami
*Assistant Examiner* — Amara Anderson
(74) *Attorney, Agent, or Firm* — HANLEY, FLIGHT & ZIMMERMAN, LLC

(57) ABSTRACT

An electric energy transmission joint and a preparation method therefor. The electric energy transmission joint includes an electric energy transmission copper part, an electric energy transmission aluminum part, and an aluminum wire. The electric energy transmission copper part includes a fixer for connection with an electric consumption device, and a connector for connection with the electric energy transmission aluminum part. A first through hole is provided inside the electric energy transmission aluminum
(Continued)

part, and a second through hole is provided inside the connector. An aluminum conductive core exposed by stripping an insulation layer from a front end of the aluminum wire is inserted into a cavity formed by the connection of the first through hole and the second through hole.

15 Claims, 2 Drawing Sheets

(51) Int. Cl.

| | |
|---|---|
| ***H01R 11/12*** | (2006.01) |
| ***H01R 43/02*** | (2006.01) |
| ***H01R 43/048*** | (2006.01) |
| ***H01R 43/16*** | (2006.01) |

(52) U.S. Cl.
CPC ......... *H01R 43/0482* (2013.01); *H01R 43/16* (2013.01)

(58) Field of Classification Search
USPC .................................................. 439/877, 878
See application file for complete search history.

(56) References Cited

U.S. PATENT DOCUMENTS

2006/0160408 A1 7/2006 Quillet
2012/0318576 A1* 12/2012 Koto ...................... H01R 4/723 174/88 R
2013/0344723 A1* 12/2013 Peters .................. H01B 7/0009 439/275

FOREIGN PATENT DOCUMENTS

| | | | | | |
|---|---|---|---|---|---|
| CN | 111326873 | | | 6/2020 | |
| CN | 211507944 | | | 9/2020 | |
| EP | 0018863 | A1 | | 11/1980 | |
| EP | 3537545 | A1 | | 9/2019 | |
| JP | S48-30300 | Y1 | * | 9/1973 | ............. H01R 11/08 |
| JP | S51-30627 | Y1 | * | 8/1976 | ............. H01R 11/10 |
| JP | S5633406 | U | | 8/1981 | |
| JP | S5727668 | U | | 2/1982 | |
| JP | 2003338350 | A | * | 11/2003 | |
| WO | 2018223887 | A1 | | 12/2018 | |
| WO | 2021197414 | A1 | | 10/2021 | |

OTHER PUBLICATIONS

Japan Patent Office, “Written Opinion,” issued in connection with Japanese Patent Application No. 2022-560117, dated May 15, 2023, 11 pages. [English Translation Included].

Japan Patent Office, “Decision to Grant a Patent,” issued in connection with Japanese Patent Application No. 2022-560117, dated Aug. 3, 2023, 5 pages. [English Translation Included].

Canadian Intellectual Property Office, “Requisition by Examiner,” issued in connection with Canadian Patent Application No. 3,173,365, dated Jan. 23, 2024, 3 pages.

Ministry of Science and Technology Socialist Republic of Vietnam, “First Office Action,” issued in connection with Vietnamese Patent Application No. 1-2022-06939, dated Apr. 24, 2024, 4 pages. [English translation provided].

International Searching Authority, “International Preliminary Report on Patentability,” issued in connection with International Patent Application No. PCT/CN2021/084901, dated Sep. 29, 2022, 11 pages (English Translation Included).

Japan Patent Office, “Notice of Reasons for Refusal,” issued in connection with Japanese Patent Application No. 2022-560117, dated Feb. 6, 2023, 8 pages (English Translation Included).

European Patent Office, “Extended European Search Report,” issued in connection with European Patent Application No. 21780842.7, dated Sep. 12, 2023, 8 pages.

The State Intellectual Property Office of People’s Republic of China, “First Office Action,” issued in connection with Chinese Patent Application No. 202010249743.8, dated Sep. 5, 2024, 12 pages. [English translation provided].

The State Intellectual Property Office of People’s Republic of China, “First Search Report,” issued in connection with Chinese Patent Application No. 202010249743.8, dated Sep. 5, 2024, 5 pages. [English translation provided].

The State Intellectual Property Office of People’s Republic of China, “The Second office Action,” issued in connection with China Patent Application No. 202010249743.8, mailed on Jan. 15, 2025, 13 pages. [English language machine translation included.].

China National Intellectual Property Administration, “Search Report,” issued in connection with China Patent Application No. 2020102497438, mailed on Apr. 27, 2025, 4 pages. [English language machine translation included.].

* cited by examiner

ELECTRIC ENERGY TRANSMISSION JOINT AND PREPARATION METHOD THEREFOR

CROSS REFERENCE TO RELATED APPLICATION

This patent arises from a US National Stage of International Application No. PCT/CN2021/084901, filed Apr. 1, 2021, which claims priority to Chinese Patent Application No. 202010249743.8, filed on Apr. 1, 2020, and entitled "ELECTRIC ENERGY TRANSMISSION JOINT AND PREPARATION METHOD THEREFOR".

TECHNICAL FIELD

The present disclosure relates to a technical field of electric connections, and particularly to an electric energy transmission joint and a preparation method therefor.

BACKGROUND

At present, under the premise of the lightweight of harnesses, aluminum wires will be widely used. However, as the terminals of electric consumption devices are mostly made of copper, aluminum wires should be connected to electric energy transmission copper parts. The electric energy transmission copper parts are generally solid, which wastes materials. In addition, the solid electric energy transmission copper parts are generally processed by hot forging, which consumes much energy, produces large processing errors, and has a high manufacturing cost. Moreover, when different shapes of electric energy transmission copper parts are connected to the aluminum wires by welding, different fixtures are required, which increases the cost and complicates the management of fixtures. Furthermore, the aluminum wires are also welded in a welding device during welding, but the aluminum wires are relatively long and soft, which not only increases the cost of the fixtures, but also makes it difficult to realize loading and unloading of materials in the automatic production, and after welding, the welding flash generated by the welding cannot be removed because aluminum wires are non-rotatable.

Therefore, in the technical field of electric connections, there is an urgent need for an electric energy transmission joint which can further reduce the weight of copper terminals and the cost of aluminum harnesses.

SUMMARY

In order to overcome the disadvantages of the prior art, the present disclosure provides an electric energy transmission joint, which uses an electric energy transmission copper part with a through hole for connection with an electric energy transmission aluminum part, so as to further reduce the weight of the electric energy transmission joint, and obviously reduce the manufacturing cost thereof.

In order to solve the above technical problem, the technical solution adopted by the present disclosure is as follows.

An electric energy transmission joint includes an electric energy transmission copper part, an electric energy transmission aluminum part, and an aluminum wire. The electric energy transmission copper part includes a fixer for connection with an electric consumption device, and a connector for connection with the electric energy transmission aluminum part. A first through hole is provided inside the electric energy transmission aluminum part, and a second through hole is provided inside the connector. An aluminum conductive core exposed by stripping an insulation layer from a front end of the aluminum wire is inserted into a cavity formed by the connection of the first through hole and the second through hole. The electric energy transmission aluminum part is connected to the aluminum wire by crimping.

The present disclosure further discloses a preparation method for an electric energy transmission joint, including:

a welding step: connecting a connector of an electric energy transmission copper part with an electric energy transmission aluminum part by welding; and an aluminum wire crimping step: inserting an aluminum conductive core, which is exposed by stripping an insulation layer from a front end of an aluminum wire, into a cavity, and then crimping the aluminum wire and the electric energy transmission aluminum part together.

As compared with the prior art, the present disclosure has the following advantages.

1. Since a second through hole is provided inside the connector of the electric energy transmission copper part, the weight of the electric energy transmission copper part is greatly reduced, and the production cost is reduced. Moreover, the electric energy transmission copper part may be formed by stamping a copper tube, so the production process is quick and simple. In addition, since the volumes of the electric energy transmission copper part and the electric energy transmission aluminum part are relatively small, it is possible to realize automatic loading and unloading of the electric energy transmission copper part and the electric energy transmission aluminum part. Furthermore, after welding it is also possible to directly cut off the flash generated during welding of the connector and the electric energy transmission aluminum part after welding, which saves the processing time and greatly improves the assembly efficiency.

2. Sealant or solder is filled in the cavity formed by the connection of the second through hole provided inside the connector and the first through hole provided inside the electric energy transmission aluminum part. Therefore, on the one hand, the sealant or solder exhausts the air in the cavity, thus preventing the air and water from corroding the connector and the electric energy transmission aluminum part. On the other hand, because the material of the electric energy transmission aluminum part is soft, the electric energy transmission aluminum part 9 being crimped to the aluminum wire 3 may reduce the mechanical property of the electric energy transmission joint; by providing the sealant or solder to connect the connector, the electric energy transmission aluminum part and the aluminum conductive core together, the connection strength between the electric energy transmission joint and the aluminum wire is increased. In addition, the sealant or solder increases the contact area between the aluminum conductive core and the contact area between the connector and the electric energy transmission aluminum part, thus further improving the electrical property of the electric energy transmission joint.

3. A transitional connection device is further provided between the aluminum conductive core and the inner wall of the cavity, and at least part of the surface of the transitional connection device is provided with protrusions for piercing oxide layers on a surface of the aluminum conductive core and a surface of the inner wall of the cavity, thus reducing the resistance between the aluminum wire and the electric energy transmission aluminum part through the protrusions, improving the electrical conductivity of a crimping region between the aluminum wire and the electric energy transmission aluminum part, and reducing the burning accident caused by the heat generated by the increased resistance in the crimping region.

4. The crimping length of the aluminum wire accounts for at least 5% of the length of the electric energy transmission aluminum part, which further increases the connection strength of the electric energy transmission aluminum part and enhances the electrical conductivity of the electric energy transmission aluminum part.

5. The inner diameter of the electric energy transmission aluminum part is one to three times the diameter of the circumscribed circle of the insulation layer of the aluminum wire. which not only avoids a situation that the aluminum wire cannot be inserted into the electric energy transmission aluminum part, but also ensures that the electric energy transmission aluminum part will not be broken due to an excessive deformation when being crimped to the aluminum wire.

6. The transitional connection device is a hollow cylinder which is at least partially sheaths the aluminum conductive core. Therefore, on the one hand, the installation of the transitional connection device realizes a large-batch automatic production and improves the production efficiency. On the other hand, the transitional connection device may pre-contract the loose aluminum wire core, so that the aluminum wire core can be inserted into the cavity more conveniently, thus avoiding a situation that part of core wires of the aluminum conductive core generated during the production is outside the cavity, and improving the product quality of the electric energy transmission joint.

7. A copper-aluminum transition layer is formed between the connector and the electric energy transmission aluminum part by mutual penetration or mutual combination of copper and aluminum atoms. The copper-aluminum transition layer can effectively reduce the electrochemical corrosion between copper and aluminum, and prolong the service life of the electric energy transmission joint by about 20%. Furthermore, the connector and the electric energy transmission aluminum part may be connected by friction welding, which can improve the production efficiency by about 26%, decrease the labor quantity, avoid mis-operations caused by personnel fatigue, reduce the safety accidents and improve the product quality.

The above description is only a summary of the technical solutions of the present disclosure. In order to understand the technical means of the present disclosure more clearly to carry out the technical means according to the specification, and in order to make the above and other objectives, features and advantages of the present disclosure more obvious and understandable, the following exemplary embodiments will be described in detail with reference to the drawings.

Figure 1:
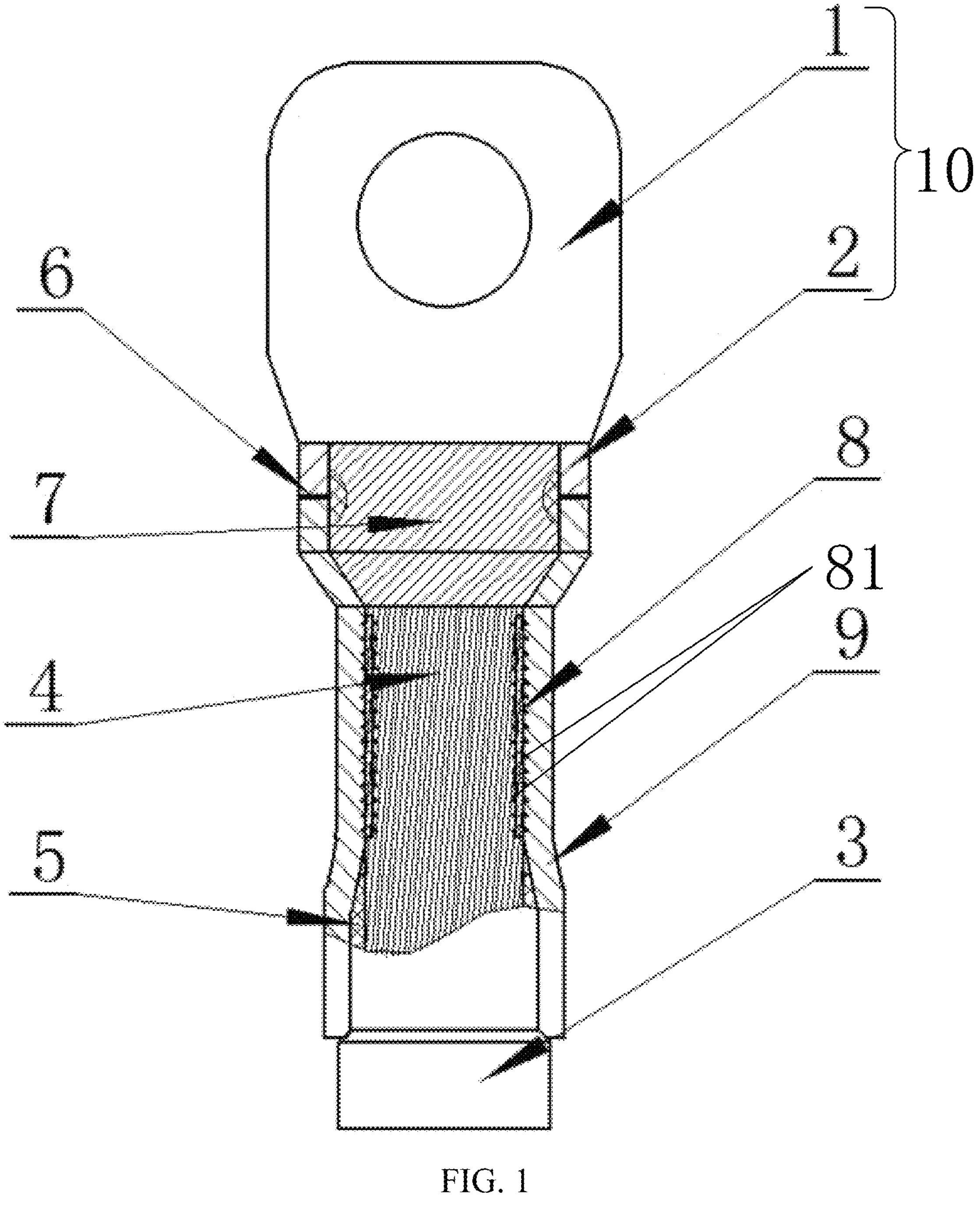
FIG. 1 and FIG. 2 are is a schematic structural diagrams of an electric energy transmission joint according to the present disclosure.

The reference numerals in FIG. 1 are as follows:

1. fixer; 2. connector; 3. aluminum wire; 4. aluminum conductive core; 5. insulation layer; 6. copper-aluminum transition layer; 7. sealant or solder; 8. transitional connection device; 9. electric energy transmission aluminum part.

DETAILED DESCRIPTION

In order to further explain the technical features adopted by the present disclosure to achieve the intended invention objective and effects thereof, the specific implementations, structures, characteristics and effects of the present disclosure will be described in detail below with reference to the drawings and the exemplary embodiments.

Figure 2:
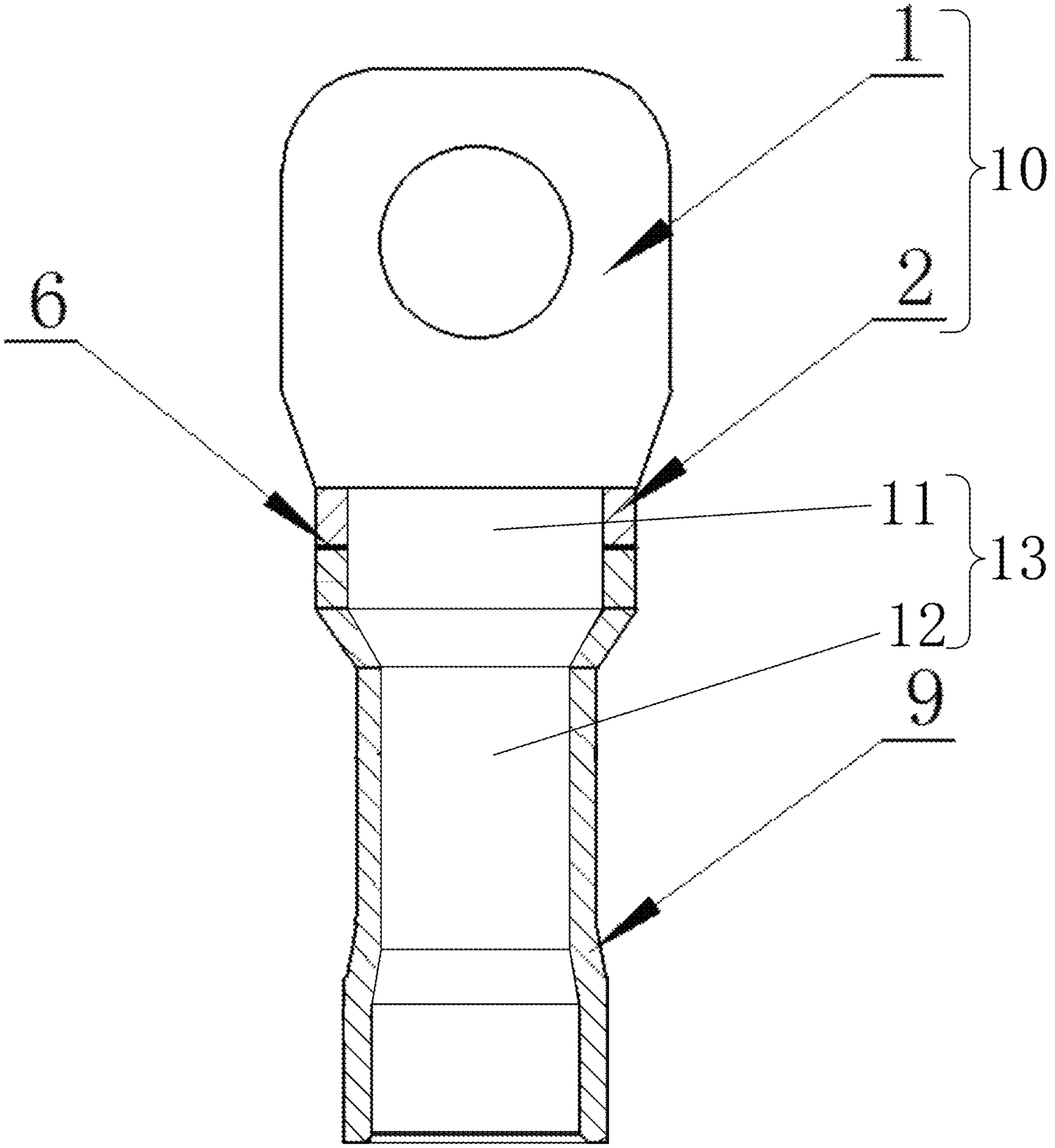

As illustrated in FIG. 1 and FIG. 2, the present disclosure discloses an electric energy transmission joint, including an electric energy transmission copper part 10, an electric energy transmission aluminum part 9, and an aluminum wire 3. The electric energy transmission copper part 10 includes a fixer 1 for connection with an electric consumption device, and a connector 2 for connection with the electric energy transmission aluminum part 9. A second through hole 11 is provided inside the connector 2, and a first through hole 12 is provided inside the electric energy transmission aluminum part 9. A front end of the aluminum wire 3 stripped of an insulation layer 5 is inserted into a cavity 13 formed by the connection of the first through hole and the second through hole, and the electric energy transmission aluminum part 9 is connected to the aluminum wire 3 by crimping.

Since the connector 2 is provided with the second through hole, the weight of the electric energy transmission copper part is greatly reduced, and the production cost is reduced. Moreover, when preparing the electric energy transmission joint, firstly the connector 2 of the electric energy transmission copper part is connected to the electric energy transmission aluminum part 9, then the front end of the aluminum wire 3 is stripped of the insulation layer 5 and inserted into the cavity formed by the connection of the first through hole and the second through hole, and finally the electric energy transmission aluminum part 9 and the aluminum wire 3 are crimped. The preparation method is simple, the automation of the assembly of the electric energy transmission joint can be realized, and the assembly efficiency is greatly improved.

In addition, since the volumes of the electric energy transmission copper part and the electric energy transmission aluminum part 9 are relatively small, it is possible to realize automatic loading and unloading of the electric energy transmission copper part and the electric energy transmission aluminum part 9. Furthermore, it is also possible to directly cut off the flash generated during welding of the connector 2 and the electric energy transmission aluminum part 9 after welding, so that the electric energy transmission joint does not carry the aluminum wire 3 when the flash is cut off, which not only saves the processing time and improves the assembly efficiency, but also avoids the influence of the aluminum wire 3 on the electric energy transmission joint when the flash is cut off, thus improving the yield of the electric energy transmission joint.

It should be noted that in the present disclosure, the electric energy transmission copper part is formed by stamping a tubular copper tube. The stamped electric energy transmission copper part includes a fixer 1 and a connector 2, and a second through hole is provided inside the connector 2. In addition, a position where the front end of the aluminum wire 3 is inserted into the cavity may be in the first through hole or the second through hole.

Since copper is an active metal, the electric energy transmission copper part is susceptible to oxidation corrosion during use, thus increasing the resistance of the electric energy transmission copper part, and even causing a burning accident in severe cases. Therefore, in order to prolong the service life of the electric energy transmission copper part, the surfaces of the fixer 1 and the connector 2 are provided with plating layers, which are made of at least one selected from the group of nickel, cadmium, zirconium, chromium, cobalt, manganese, aluminum, tin, titanium, zinc, copper, silver, and gold, thus reducing the oxidation corrosion speed of the electric energy transmission copper part and prolonging the service life thereof.

As an exemplary solution, an inner diameter of the electric energy transmission aluminum part 9 is one to three times a diameter of a circumscribed circle of the insulation layer 5 of the aluminum wire. On the one hand, it can facilitate the front end of the aluminum wire 3 stripped of the insulation layer 5 to be inserted into the cavity formed by the connection of the first through hole and the second through hole. On the other hand, since the electric energy transmission aluminum part 9 is connected to the aluminum wire 3 by crimping, if the inner diameter of the electric energy transmission aluminum part 9 is more than three times the diameter of the circumscribed circle of the insulation layer 5 of the aluminum wire, the electric energy transmission aluminum part 9 should be compressed by a large proportion to be crimped to the aluminum wire 3, which easily leads to the breakage of the electric energy transmission aluminum part 9.

To verify the influence of a ratio of the inner diameter of electric energy transmission aluminum part to the diameter of the circumscribed circle of the insulation layer 5 of the aluminum wire on a pullout force and a voltage drop of the electric energy transmission joint, the inventor investigates the pullout forces and the voltage drops of the electric energy transmission joints made under different ratios of the inner diameter of the electric energy transmission aluminum part 9 to the diameter of the circumscribed circle of the insulation layer 5 of the aluminum wire were. The experimental results are shown in Table 1.

TABLE 1

Influence of the ratio of the inner diameter of the electric energy transmission aluminum part to the diameter of the circumscribed circle of the insulation layer of the aluminum wire on the properties of the electric energy transmission joint

| | Different ratios of the inner diameter of the electric energy transmission aluminum part to the diameter of the circumscribed circle of the insulation layer of the aluminum wire | | | | | | | | | | |
|---|---|---|---|---|---|---|---|---|---|---|---|
| No. | 0.95 | 1 | 1 | 1.05 | 1.1 | 1.5 | 2 | 2.5 | 3 | 3.1 | 3.5 |
| 1 | Pullout force of the electric energy transmission joint (N) | | | | | | | | | | |
| | Non-insertable | Non-insertable | 2172 | 2827 | 3076 | 3451 | 3168 | 2853 | 2022 | 1462 | Breakage |
| 2 | Voltage drop of the electric energy transmission joint (mV) | | | | | | | | | | |
| | — | — | 0.48 | 0.45 | 0.39 | 0.36 | 0.38 | 0.42 | 0.49 | 0.68 | — |

which easily leads to the breakage of the electric energy transmission aluminum part 9.

Sealant or solder 7 is filled between the cavity and an aluminum conductive core 4 which is exposed by stripping the insulation layer 5 from the front end of the aluminum wire 3. On the one hand, the injection of the sealant or solder 7 exhausts the air in the cavity, thus preventing the air and water in the cavity from corroding the connector 2 and the electric energy transmission aluminum part 9. On the other hand, because the material of the electric energy transmission aluminum part 9 is soft, the electric energy transmission aluminum part 9 being crimped to the aluminum wire 3 may reduce the mechanical property of the electric energy transmission joint; by providing the sealant or solder 7 to connect the connector 2, the electric energy transmission aluminum part 9 and the aluminum conductive core 4 together, the connection strength between the electric energy transmission joint and the aluminum wire 3 is increased. In addition, the sealant or solder 7 increases the contact area between the aluminum conductive core 4 and the contact area between the connector 2 and the electric energy transmission aluminum part 9, thus further improving the electrical property of the electric energy transmission joint.

It should be noted that in the present disclosure, the material of the solder contains at least one selected from the group of nickel and nickel alloy, cadmium and cadmium alloy, zirconium and zirconium alloy, chromium and chromium alloy, cobalt and cobalt alloy, manganese and manganese alloy, tin and tin alloy, titanium and titanium alloy, zinc and zinc alloy, copper and copper alloy, silver and silver alloy, and gold and gold alloy. Exemplarily, the material of the solder is metal or alloy with a melting point not higher than aluminum.

As can be seen from Table 1, when the ratio of the inner diameter of the electric energy transmission aluminum part 9 to the diameter of the circumscribed circle of the insulation layer 5 of the aluminum wire is less than 1, the aluminum wire 3 cannot be inserted into the electric energy transmission aluminum part. When the ratio of the inner diameter of the electric energy transmission aluminum part 9 to the diameter of the circumscribed circle of the insulation layer 5 of the aluminum wire is greater than 3, the pullout force of the electric energy transmission joint is lower than a standard value of 2,000 N, and the voltage drop of the electric energy transmission joint is higher than a standard value of 0.5 mV, which do not meet the requirements of mechanical and electrical properties of the electric energy transmission joint. In addition, when the ratio of the inner diameter of the electric energy transmission aluminum part 9 to the diameter of the circumscribed circle of the insulation layer 5 of the aluminum wire is large, the electric energy transmission aluminum part 9 should be compressed by a large proportion to be crimped to the aluminum wire 3, which easily leads to the breakage of the electric energy transmission aluminum part 9.

Moreover, since the sealant 7 has good ductility and sealing property, when being filled between the aluminum conductive core 4 and the cavity, the sealant 7 can seal and protect a region between the aluminum conductive core 4 and the cavity, so that the aluminum conductive core 4 and the cavity are well protected from being eroded by moisture and salt mist, thus prolonging the service life of the electric energy transmission joint.

The sealant 7 includes, but is not limited to, a conductive adhesive, a rubber-based sealant, a resin-based sealant, or an oil-based sealant.

In order to understand the influence of the sealant or solder on the properties of the electric energy transmission joint, the inventor carries out a Second Experiment, and the experimental results are shown in Table 2.

TABLE 2

Influence of sealant or solder on the properties of the electric energy transmission joint

| No. | Type: The cavity is not filled — Pullout force (N) | Type: The cavity is not filled — Voltage drop (mV) | Type: The cavity is filled with sealant — Pullout force (N) | Type: The cavity is filled with sealant — Voltage drop (mV) | Type: The cavity is filled with solder — Pullout force (N) | Type: The cavity is filled with solder — Voltage drop (mV) |
|---|---|---|---|---|---|---|
| 1 | / | | The sealant is polysulfide rubber | | The solder is zinc or zinc alloy | |
| | 2345 | 0.41 | 3125 | 0.37 | 3627 | 0.24 |
| 2 | / | | The sealant is silicone rubber | | The solder is tin or tin alloy | |
| | 2561 | 0.43 | 3086 | 0.39 | 3735 | 0.23 |
| 3 | / | | The sealant is neoprene rubber | | The solder is nickel or nickel alloy | |
| | 2472 | 0.42 | 3147 | 0.38 | 3689 | 0.21 |
| 4 | / | | The sealant is butyl rubber | | The solder is cadmium or cadmium alloy | |
| | 2544 | 0.41 | 3258 | 0.36 | 3717 | 0.23 |
| 5 | / | | The sealant is epoxy resin | | The solder is zirconium or zirconium alloy | |
| | 2342 | 0.44 | 3182 | 0.36 | 3844 | 0.22 |
| 6 | | | The sealant is phenolic resin | | The solder is chromium or chromium alloy | |
| | 2465 | 0.41 | 3146 | 0.37 | 3946 | 0.21 |
| 7 | / | | The sealant is unsaturated polyester resin | | The solder is cobalt or cobalt alloy | |
| | 2385 | 0.42 | 3247 | 0.38 | 3726 | 0.24 |
| 8 | | | The sealant is polyacrylic resin | | The solder is manganese or manganese alloy | |
| | 2556 | 0.43 | 3081 | 0.39 | 3861 | 0.23 |
| 9 | | | The sealant is polyvinyl chloride resin | | The solder is titanium or titanium alloy | |
| | 2483 | 0.41 | 3167 | 0.35 | 3936 | 0.21 |
| 10 | | | The sealant is polyurethane rubber | | The solder is silver or silver alloy | |
| | 2459 | 0.43 | 3192 | 0.37 | 3875 | 0.23 |
| Average value | 2461.2 | 0.421 | 3163.1 | 0.372 | 3795.6 | 0.225 |

As can be seen from the above table, when sealant or solder is filled between the aluminum conductive core 4 and the cavity, the pullout force of the electric energy transmission joint is obviously larger than that when no sealant or solder is filled between the aluminum conductive core 4 and the cavity, and the voltage drop thereof is smaller than that when no sealant or solder is filled between the aluminum conductive core 4 and the cavity. Therefore, the electric energy transmission joint has better electrical and chemical properties when the sealant or solder is filled between the aluminum conductive core 4 and the cavity.

As a further exemplary solution, a transitional connection device 8 is further provided between the aluminum conductive core 4 and the inner wall of the cavity, and at least part of the surface of the transitional connection device 8 is provided with protrusions 81 for piercing oxide layers on a surface of the aluminum conductive core 4 and a surface of the inner wall of the cavity.

It should be noted that in the present disclosure, the material of the transitional connection device 8 contains at least one selected from the group of nickel and nickel alloy, cadmium and cadmium alloy, zirconium and zirconium alloy, chromium and chromium alloy, cobalt and cobalt alloy, manganese and manganese alloy, tin and tin alloy, titanium and titanium alloy, zinc and zinc alloy, copper and copper alloy, silver and silver alloy, and gold and gold alloy.

On the one hand, the protrusions increase the contact area between the aluminum conductive core 4, the transitional connection device 8 and the electric energy transmission aluminum part 9, while increasing the friction between the aluminum wire 3 and the transitional connection device 8 and between the transitional connection device 8 and the electric energy transmission aluminum part 9, so that the aluminum wire 3 can be prevented from being separated from the electric energy transmission aluminum part 9, thereby improving the mechanical property of the electric energy transmission joint.

On the other hand, the protrusions further increase the number of conductive bumps of the aluminum conductive core 4, which enhances the electric conduction effect while damaging the oxide layers on the surface of the aluminum conductive core 4 and the surface of the inner wall of the cavity, so that the aluminum conductive core 4 directly contacts the transitional connection device 8, and the transitional connection device 8 directly contacts the conductive part of the cavity, thus improving the electrical property of the electric energy transmission joint.

Specifically, the protrusions are a corrugated structure, a serrated structure, a pit structure, a spike structure, an inverted toothed structure, or a mesh structure, which not only increases the surface area of the transitional connection device 8, but also enhances the connection between the transitional connection device 8 and the electric energy transmission aluminum part 9, and can also break more oxide layers, so as to improve the electric conductivity.

In order to understand the influence of the protrusions on the properties of the electric energy transmission joint, the inventor demonstrates by taking the examples in which the protrusions are a corrugated structure, a serrated structure, a pit structure, a spike structure, an inverted toothed structure, and a mesh structure. The results are shown in Table 3.

TABLE 3

Influence of the protrusions on the properties of the electric energy transmission joint

| Number of experiments | No protrusion: Pullout force (N) | No protrusion: Voltage drop (mV) | Protrusions of cormgated structure: Pullout force (N) | Protrusions of cormgated structure: Voltage drop (mV) | Protrusions of serrated structure: Pullout force (N) | Protrusions of serrated structure: Voltage drop (mV) | Protrusions of pit structure: Pullout force (N) |
|---|---|---|---|---|---|---|---|
| 1 | 2248 | 0.33 | 3325 | 0.26 | 3427 | 0.25 | 3067 |
| 2 | 2325 | 0.34 | 3265 | 0.25 | 3335 | 0.23 | 3129 |
| 3 | 2267 | 0.37 | 3362 | 0.25 | 3489 | 0.23 | 3098 |
| 4 | 2326 | 0.35 | 3258 | 0.24 | 3317 | 0.23 | 3104 |
| 5 | 2342 | 0.39 | 3382 | 0.23 | 3356 | 0.22 | 3302 |
| 6 | 2278 | 0.38 | 3378 | 0.23 | 3275 | 0.23 | 3109 |
| 7 | 2345 | 0.36 | 3244 | 0.24 | 3346 | 0.24 | 2994 |
| 8 | 2286 | 0.38 | 3379 | 0.22 | 3427 | 0.24 | 3112 |
| 9 | 2351 | 0.37 | 3367 | 0.23 | 3351 | 0.21 | 3056 |
| 10 | 2367 | 0.39 | 3417 | 0.21 | 3359 | 0.21 | 3123 |
| Average value | 2313.5 | 0.366 | 3337.7 | 0.236 | 3368.2 | 0.229 | 3109.4 |

| Number of experiments | Protrusions of pit structure: Voltage drop (mV) | Protrusions of spike structure: Pullout force (N) | Protrusions of spike structure: Voltage drop (mV) | Protrusions ofn inverted toothed structure: Pullout force (N) | Protrusions ofn inverted toothed structure: Voltage drop (mV) | Protrusions of mesh structure: Pullout force (N) | Protrusions of mesh structure: Voltage drop (mV) |
|---|---|---|---|---|---|---|---|
| 1 | 0.30 | 3329 | 0.26 | 3129 | 0.28 | 3219 | 0.29 |
| 2 | 0.29 | 3109 | 0.25 | 3329 | 0.27 | 3110 | 0.28 |
| 3 | 0.28 | 3203 | 0.24 | 3218 | 0.26 | 3421 | 0.28 |
| 4 | 0.28 | 3317 | 0.24 | 3422 | 0.27 | 3317 | 0.29 |
| 5 | 0.29 | 3402 | 0.25 | 3189 | 0.28 | 3267 | 0.25 |
| 6 | 0.31 | 3217 | 0.26 | 3122 | 0.27 | 3263 | 0.28 |
| 7 | 0.27 | 3109 | 0.24 | 3421 | 0.25 | 3145 | 0.29 |
| 8 | 0.28 | 3219 | 0.24 | 3376 | 0.28 | 3189 | 0.27 |
| 9 | 0.27 | 3118 | 0.29 | 3219 | 0.29 | 3127 | 0.29 |
| 10 | 0.29 | 3279 | 0.28 | 3187 | 0.26 | 3129 | 0.28 |
| Average value | 0.286 | 3230.2 | 0.255 | 3261.2 | 0.271 | 3218.7 | 0.28 |

As can be seen from the above table, when at least part of the surface of the transitional connection device 8 is provided with the protrusions in the above shapes or structures, the pullout force of the electric energy transmission joint is larger than that of the electric energy transmission joint without protrusions provided on the surface of the transitional connection device 8, and the voltage drop thereof is smaller than that of the electric energy transmission joint without protrusions provided on the surface of the transitional connection device 8. Therefore, when at least part of the surface of the transitional connection device 8 is provided with the protrusions, the electric energy transmission joint has better mechanical and electrical properties.

In other embodiments, the transitional connection device 8 is a hollow cylinder at least partially sheathing the aluminum conductive core 4. When the transitional connection device 8 is a hollow cylinder, on the one hand, an automatic production with high production efficiency can be realized; on the other hand, the loose aluminum conductive core 4 can be pre-contracted by the transitional connection device 8, so that the aluminum conductive core 4 can be inserted into the cavity more conveniently, thus avoiding a situation that part of core wires of the aluminum conductive core 4 generated during the production cannot be inserted into the cavity, and facilitating the production and the processing of the electric energy transmission joint.

In order to improve the effect of crimping the electric energy transmission aluminum part 9 and the aluminum wire 3, a crimping length of the aluminum wire 3 accounts for at least 5% of a length of the electric energy transmission aluminum part 9. This is because if the crimping length of the aluminum wire 3 is too short, the fixing force of the electric energy transmission aluminum part 9 to the aluminum wire 3 is insufficient, and the aluminum wire 3 is easily separated from the electric energy transmission aluminum part 9. Moreover, if the crimping length is too short, the contact area between the aluminum wire 3 and the electric energy transmission aluminum part 9 at the crimping position decreases, the current conduction region is relatively small, and a resistance between the aluminum wire 3 and the electric energy transmission aluminum part 9 increases, resulting in heat at the crimping position, which will degrade the electrical property of the electric energy transmission joint, and even cause a burning accident in severe cases.

In order to understand the influence of a ratio of the crimping length of the aluminum wire 3 to the length of the electric energy transmission aluminum part 9 on the properties of the electric energy transmission joint, the inventor investigates the ratio of the crimping length of different aluminum wires 3 to the length of the electric energy transmission aluminum part 9, and then tests the mechanical and electrical properties of the electric energy transmission joint. The detailed test results are shown in Table 4.

TABLE 4

Influence of the ratio of the crimping length of the aluminum wire to the length of the electric energy transmission aluminum part on the properties of the electric energy transmission joint

| | The ratio of the crimping length of the aluminum wire to the length of the electric energy transmission aluminum part (%) | | | | | | | | | | | | |
|---|---|---|---|---|---|---|---|---|---|---|---|---|---|
| No. | 1 | 3 | 5 | 10 | 20 | 30 | 40 | 50 | 60 | 70 | 80 | 90 | 100 |
| 1 | Pullout force of the electric energy transmission joint (N) | | | | | | | | | | | | |
| | 558 | 1042 | 2345 | 2642 | 2781 | 2958 | 3024 | 3124 | 3265 | 3346 | 3471 | 3586 | 3647 |
| 2 | Voltage drop of the electric energy transmission joint (mV) | | | | | | | | | | | | |
| | 0.75 | 0.64 | 0.48 | 0.46 | 0.42 | 0.40 | 0.38 | 0.37 | 0.35 | 0.33 | 0.31 | 0.28 | 0.26 |

As can be seen from the above table, when the ratio of the crimping length of the aluminum wire 3 to the length of the electric energy transmission aluminum part 9 is less than 5%, the pullout force of the electric energy transmission joint is less than 2,000 N, which does not meet the requirements of the mechanical property of the aluminum joint, and the voltage drop is greater than 0.5 mV, which does not meet the requirement of the electrical property, thus seriously affecting the service life of the electric energy transmission joint. Therefore, exemplarily, the crimping length of the aluminum wire 3 accounts for at least 5% of the length of the electric energy transmission aluminum part 9.

As a further exemplary solution, the connector 2 and the electric energy transmission aluminum part 9 are connected by welding.

It should be noted that the welding may include friction welding, resistance welding, ultrasonic welding, electromagnetic welding, pressure diffusion welding, or arc welding, which are described below.

(1) The friction welding is to perform welding using friction welding equipment, which rotates a first workpiece and causes a second workpiece to apply pressure to the rotating first workpiece, so heat is generated by friction and the first and second workpieces are welded together by the pressure. The friction welding has advantages of fast welding speed without pollution such as noise, smoke, and strong light.

(2) The resistance welding uses resistance heat generated by the current passing through weldments and the contact place thereof as a heat source to heat the weldments locally, and at the same time, pressure is applied for welding. The advantages are that no filler metal is required, the productivity is high, the deformation of the weldment is small, and the automation is easy to realize.

(3) The ultrasonic welding is to transmit high frequency vibration waves to surfaces of two objects that need to be welded. Under pressure, fusion between the molecular layers is formed by rubbing the surfaces of the two objects against each other, which has the advantages of short welding time, no need of any flux, gas, or solder, no spark for welding, environmentally friendly and safe.

(4) The electromagnetic welding is to generate a strong magnetic field by utilizing instantaneous electric current, such that weldments are welded together under the action of magnetic field force, which has the advantages of non-contact welding, high welding speed, low welding internal stress, and high machining precision.

(5) The pressure diffusion welding is to press two weldments together, and metallurgically connect the weldments by interatomic diffusion through heat preservation, which has advantages that the weldments are not overheat or melted, the quality of the welding joint is high, a large-area weldment can be welded, the welding precision of the weldments is high, and the deformation is small.

(6) The arc welding is a physical phenomenon using an electric arc as a heat source and discharging electricity utilizing air, to convert the electric energy into the heat and mechanical energy required for welding, so as to achieve the purpose of connecting metal. The arc welding has advantages that the welding environment is not limited, and it is suitable for welding weldments with various metal materials, various thicknesses and various structural shapes. Plasma welding, as a kind of arc welding, can be used to realize precise welding. The plasma arc has concentrated energy, high productivity, fast welding speed, small stress deformation and more stable arc.

As a further exemplary solution, the connector 2 and the electric energy transmission aluminum part 9 are connected by friction welding, because the friction welding is simpler for butt parts of large cross-sectional areas with through holes.

As a further exemplary solution, a copper-aluminum transition layer 6 is formed between the connector 2 and the electric energy transmission aluminum part 9 by mutual penetration or mutual combination of copper and aluminum atoms, and the copper-aluminum transition layer 6 at least contains a mixture of copper and aluminum, or a mixture of copper, aluminum and copper-aluminum solid solution. Furthermore, the copper-aluminum transition layer 6 can slow down the electrochemical corrosion between copper and aluminum, and prolong the service life of the electric energy transmission joint.

The present disclosure further discloses a preparation method for an electric energy transmission joint, including:

- a welding step: connecting a connector 2 of an electric energy transmission copper part with an electric energy transmission aluminum part 9 by welding; and
- an aluminum wire 3 crimping step: inserting an aluminum conductive core 4, which is exposed by stripping an insulation layer 5 from a front end of an aluminum wire 3, into a cavity, and then crimping the aluminum wire 3 and the electric energy transmission aluminum part 9 together.

Further, between the welding step and the aluminum wire 3 crimping step, the method further includes a step of filling sealant or solder 7 between the aluminum conductive core 4 and the cavity.

Specifically, filling the cavity with the sealant or solder 7 includes: pouring, through holes on a surface of the electric energy transmission copper part, molten sealant or solder 7 into the electric energy transmission copper part and the electric energy transmission aluminum part 9 having been welded.

Further exemplarily, between the step of filling the cavity with the sealant or solder 7 and the aluminum wire 3 crimping step, the method further includes a step of sheathing the aluminum conductive core 4 by a transitional connection device 8.

It should be noted that in the description of the present disclosure, the terms such as 'first' and 'second' are only used to describe the names of various components, and cannot be understood as indicating or implying the relative importance of each component.

Those described are only exemplary embodiments of the present disclosure, and cannot limit the protection scope of the present disclosure. Any insubstantial change or substitution made by those skilled in the art based on the present disclosure should fall within the protection scope of the present disclosure.

The invention claimed is:

1. An electric energy transmission joint, comprising an electric energy transmission copper part, an electric energy transmission aluminum part, and an aluminum wire, with the electric energy transmission copper part comprising a fixer for connection with an electric consumption device and a connector for connection with the electric energy transmission aluminum part, wherein a first through hole is provided inside the electric energy transmission aluminum part, a second through hole is provided inside the connector, an aluminum conductive core exposed by stripping an insulation layer from a front end of the aluminum wire is inserted into a cavity formed by the connection of the first through hole and the second through hole, and the electric energy transmission aluminum part is connected to the aluminum wire by crimping;

a transitional connection device is further provided between the aluminum conductive core and an inner wall of the cavity, and both an inner surface and an outer surface of the transitional connection device are provided with protrusions for piercing oxide layers on an outer surface of the aluminum conductive core and the inner wall of the cavity.

2. The electric energy transmission joint according to claim 1, wherein an inner diameter of the electric energy transmission aluminum part is one to three times a diameter of a circumscribed circle of the insulation layer of the aluminum wire.

3. The electric energy transmission joint according to claim 1, wherein sealant or solder is filled between the aluminum conductive core and the cavity.

4. The electric energy transmission joint according to claim 1, wherein the protrusions are a corrugated structure, a serrated structure, a pit structure, a spike structure, an inverted toothed structure, or a mesh structure.

5. The electric energy transmission joint according to claim 1, wherein the transitional connection device is a hollow cylinder at least partially sheathing the aluminum conductive core.

6. The electric energy transmission joint according to claim 5, wherein a side wall of the hollow cylinder has a thickness smaller than a thickness of a side wall of the electric energy transmission aluminum part.

7. The electric energy transmission joint according to claim 1, wherein a crimping length of the aluminum wire accounts for at least 5% of a length of the electric energy transmission aluminum part.

8. The electric energy transmission joint according to claim 1, wherein the connector and the electric energy transmission aluminum part are connected by welding.

9. The electric energy transmission joint according to claim 8, wherein the connector and the electric energy transmission aluminum part are connected by friction welding.

10. The electric energy transmission joint according to claim 8, wherein a copper-aluminum transition layer is formed between the connector and the electric energy transmission aluminum part by mutual penetration or mutual combination of copper and aluminum atoms.

11. The electric energy transmission joint according to claim 10, wherein sealant or solder is filled between the aluminum conductive core and the cavity; and a portion of the sealant or solder is filled inside the connector, the other portion of the sealant or solder is filled inside the electric energy transmission aluminum part, and the sealant or solder is in contact with the copper-aluminum transition layer.

12. The electric energy transmission joint according to claim 10, wherein sealant or solder is filled between the aluminum conductive core and the cavity; and the sealant or solder fills the entire second through hole, and fills an entire portion of the first through hole which is located between the copper-aluminum transition layer and an end face of the aluminum conductive core.

13. A preparation method for the electric energy transmission joint according to claim 1, comprising:

a welding step: connecting the connector of the electric energy transmission copper part with the electric energy transmission aluminum part by welding;

a step of sheathing the transitional connection device on the aluminum conductive core that is exposed by stripping the insulation layer from the front end of the aluminum wire, with protrusions on the inner surface of the transitional connection device piercing the oxide layer on the outer surface of the aluminum conductive core; and an aluminum wire crimping step: inserting the aluminum conductive core, which is sheathed with the transitional connection device, into the cavity, and then crimping the aluminum wire and the electric energy transmission aluminum part together, with protrusions on the outer surface of the transitional connection device piercing the oxide layer on the inner wall of the cavity.

14. The preparation method according to claim 13, further comprising a step of filling sealant or solder between the aluminum conductive core and the cavity.

15. The electric energy transmission joint according to claim 1, wherein the protrusions on the outer surface of transitional connection device protrude radially beyond the outer surface of the aluminum conductive core.

* * * * *